United States Patent [19]
Lamm

[11] Patent Number: 5,747,956
[45] Date of Patent: May 5, 1998

[54] METHOD OF CONTROLLING THE RPM OF A MOTOR

[75] Inventor: Hubert Lamm, Kappelrodeck, Germany

[73] Assignee: Robert Bosch GmbH, Stuttgart, Germany

[21] Appl. No.: 318,720

[22] PCT Filed: Feb. 4, 1994

[86] PCT No.: PCT/DE94/00106

§ 371 Date: Oct. 13, 1994

§ 102(e) Date: Oct. 13, 1994

[87] PCT Pub. No.: WO94/19863

PCT Pub. Date: Sep. 1, 1994

[30] Foreign Application Priority Data

Feb. 18, 1993 [DE] Germany ................. 43 04 960.5

[51] Int. Cl.[6] ................................................ G05B 11/28
[52] U.S. Cl. ..................... 318/599; 318/254; 318/138; 318/439
[58] Field of Search .......................... 318/254, 138, 318/439, 599, 798–815; 388/909

[56] References Cited

U.S. PATENT DOCUMENTS

| | | | |
|---|---|---|---|
| 4,782,272 | 11/1988 | Buckley et al. | 318/254 X |
| 5,084,658 | 1/1992 | Nielsen et al. | 318/139 |
| 5,089,761 | 2/1992 | Nakazawa. | |
| 5,146,145 | 9/1992 | Wood et al. | 318/254 X |
| 5,341,452 | 8/1994 | Ensor | 318/138 X |
| 5,459,386 | 10/1995 | Okachi et al. | 318/798 X |

FOREIGN PATENT DOCUMENTS

| | | |
|---|---|---|
| 3314823 | 10/1984 | Germany. |
| 36 33 347 | 4/1988 | Germany. |
| 3731469 | 4/1989 | Germany. |
| 3841938 | 6/1990 | Germany. |
| 4038199 | 6/1992 | Germany. |
| 63-129874 | 6/1988 | Japan. |
| 63-129874 | 10/1988 | Japan. |

*Primary Examiner*—Karen Masih
*Attorney, Agent, or Firm*—Spencer & Frank

[57] ABSTRACT

A method of controlling the rpm of a motor by employing an incremental indicator or sensor (rpm), in which motor control with a reduced starting torque and a reduced startup short-circuit current is intended to be attained in a simple manner. For this purpose a control signal guided to a power output stage that actuates the motor is pulse-width modulated.

13 Claims, 3 Drawing Sheets

5,747,956

METHOD OF CONTROLLING THE RPM OF A MOTOR

STATE OF THE ART

The invention relates to a method of controlling the rpm of a motor by utilizing an incremental indicator.

It is known to perform an adjustment of the most varied devices, for example in motor vehicles, by means of servomotors. These servomotors are frequently used in motor vehicles to improve comfort, for example, in seat or window adjustment and the like. As a rule, these adjustment motors are equipped with integrated motor electronics, or are controlled by central electronics. To achieve precise positioning of the systems driven with the servomotors, it is known to integrate an incremental indicator or sensor configured as a path indicator which permits the devices to be adjusted to be transferred into different positions by means of an operating element.

It is, however, disadvantageous that, because of a possible jerky actuation of the servomotor, the actual adjustment mechanism is exposed to extremely high mechanical stress, which can lead to premature wear of the mechanical parts. Moreover, each actuation of the servomotor is associated with a startup short-circuit current that puts extreme stress on the voltage source only present to a limited degree in a motor vehicle.

SUMMARY AND ADVANTAGES OF THE INVENTION

The object of the invention is to create a method of controlling the rpm of a motor of the generic type, with which method motor control with a reduced startup short-circuit current and a reduced starting torque is possible.

In accordance with the invention, the above object generally is accomplished by a method of setting the rpm of an electric motor, wherein a control signal, which is supplied to a power output stage that actuates the motor, is pulse-width modulated and the actual rpm of the electric motor is measured via a measuring device (incremental indicator), and wherein the actual rpm is compared to a predetermined reference rpm value, and, if the reference rpm is not reached, the pulse width of the control signal is changed, e.g., increased, until the reference rpm value is reached.

By means of pulse-width modulation, it is accomplished that the control signal, cooperating with the incremental indicator, or sensor (RPM) can perform rpm control of the motor without problems. Through the availability of a plurality of possible rpms, a reduced starting torque in particular is achieved in addition to the improvement in comfort by means of more precise positioning options of the device to be adjusted. Thus, a jerky stress on the mechanical parts which effect the adjustment is avoided.

Furthermore, it is possible to perform a so-called soft start or soft stop of the motor by means of the adjustment of a motor rpm that is reduced initially. It is advantageous that the startup short-circuit current stressing the voltage source can be reduced by a gradual running-up of the motor rpm, and, in addition, a vibration-free and thus noise-reducing level adjustment of mechanical parts up to the maximum stress range is possible.

In a further embodiment of the invention, it is provided that the motor rpm is monitored and compared to a reference value. At the slightest deviation, an adaptation of the motor rpm can take place by means of the pulse-width modulation of the control signal. With this it can be accomplished in an advantageous manner that, despite a possibly exceedingly low battery voltage or excessive stress, the motor rpm can be set at the minimum necessary to achieve a sufficient adjustment speed.

Further advantageous embodiments of the invention ensue from the measures outlined in the dependent claims.

BRIEF DESCRIPTION OF THE DRAWING

The invention is described in detail below in embodiments shown in the associated drawings wherein.

DETAILING DESCRIPTION OF THE PREFERRED EMBODIMENTS

Figure 1:
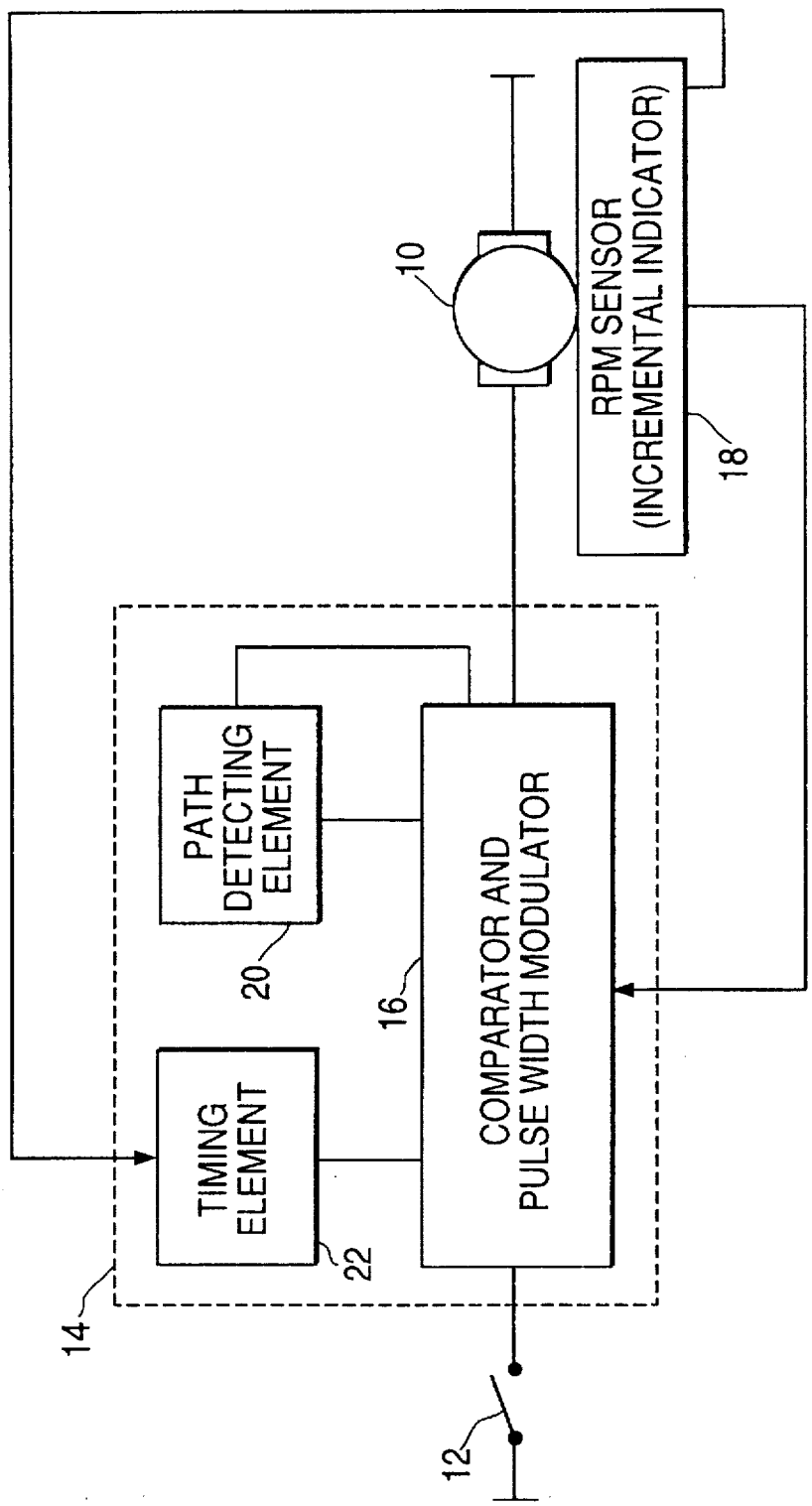
FIG. 1 is a block circuit diagram of an apparatus for practicing the method according to the invention.

Referring now to FIG. 1, there is shown a block diagram of the rpm control apparatus for carrying out the method according to the invention. As shown, a motor 10 can be connected to a supply voltage by a switching means 12. The motor 10 is actuated or supplied power via a controllable power output stage which, as a whole, is identified by reference numeral 14. The power output stage 14 comprises a component 16 for comparing a reference rpm value with the actual motor rpm value and for providing a pulse width modulation known per se of the supply voltage for the motor 10. An incremental indicator or rpm sensor 18, which per se is well known in the art, is provided for the motor 10. The incremental indicator or sensor 10, for example, generates pulses proportional to the rpm of the motor 10 and thus provides an rpm measurement of the motor 10. A timing element 20 and a path detecting element 22 are connected to the pulse-width-modulation component 16. The path element 22 may be coupled to the incremental indicator 18 so that an adjustment path of a part or member that is driven by the motor 10 can be inferred according to the number of pulses emitted by the incremental indicator 18. The time element 20, for example, may be a counter which starts counting at a fixed clock frequency when the motor 10 is started and makes a pulse available to the component 16 once a selected time duration has expired.

Figure 2:
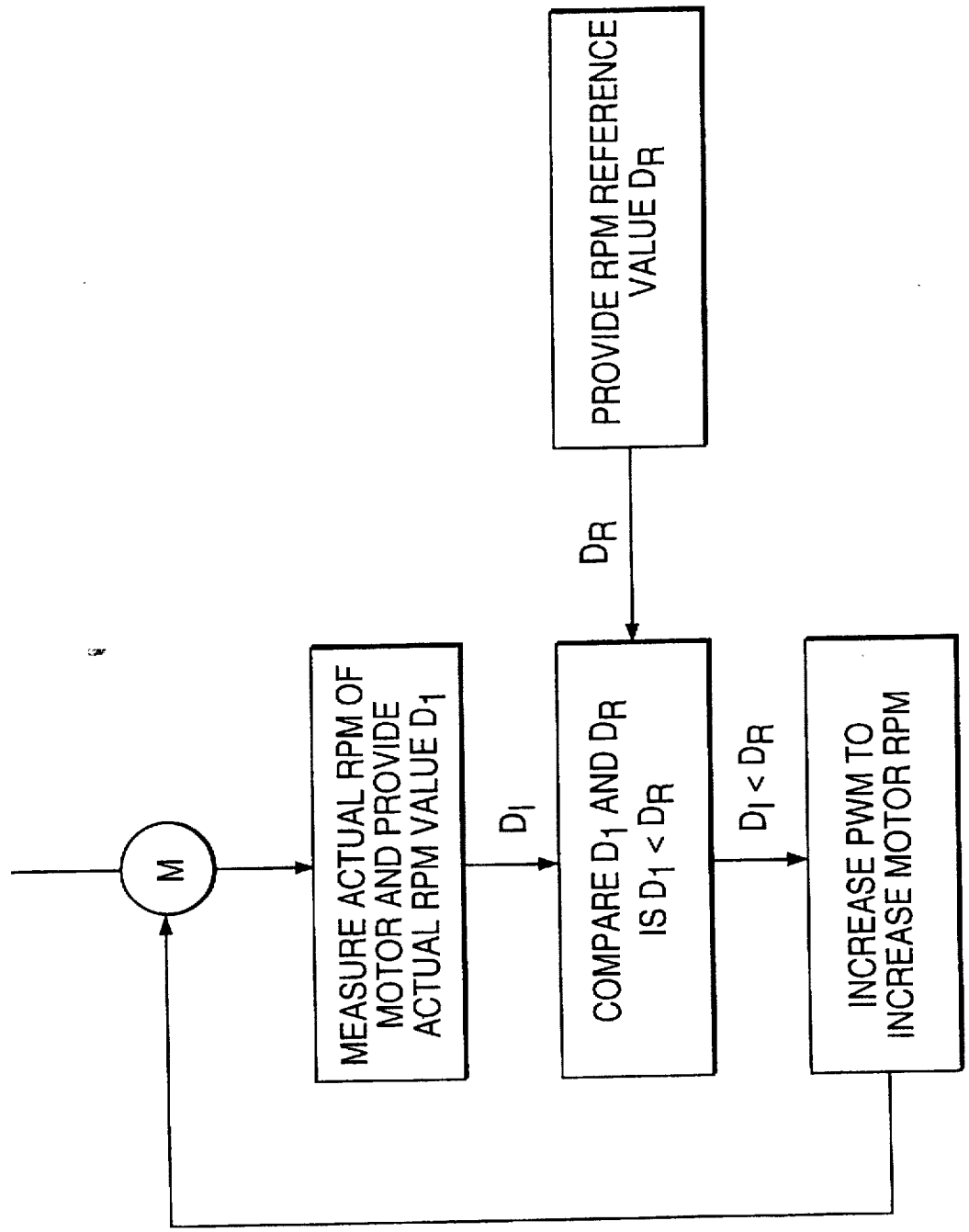
FIG. 2 is a logic flow diagram for the circuit of FIG. 1.

The function of the circuit arrangement is explained by the flow chart in FIG. 2. When the motor 10 is switched on, the voltage signal is pulse width modulated via the component 16 so that the rpm of the motor 10 is influenced in a desired manner known per se. By means of the time element 20 and/or the path element 22 it can be defined that a changed reference rpm is predetermined as a function of a specific time duration since the motor 10 was switched on or of traversing a specific adjustment path of the part that is adjusted by the motor 10.

The instantaneous actual rpm, the actual rpm DI, is fed to component 16 by the incremental indicator or sensor 18, with a comparison between the actual rpm DI and the predetermined reference rpm DR taking place within the component 16. If the actual rpm DI is smaller than the reference rpm, the pulse width is increased and thus, the actual rpm DI is adapted to the reference rpm DR. If the actual rpm DI reaches the reference rpm DR, no further pulse width enlargement takes place unless a new reference rpm DR is predetermined via the time element 20 and/or the path element 22.

Figure 3:
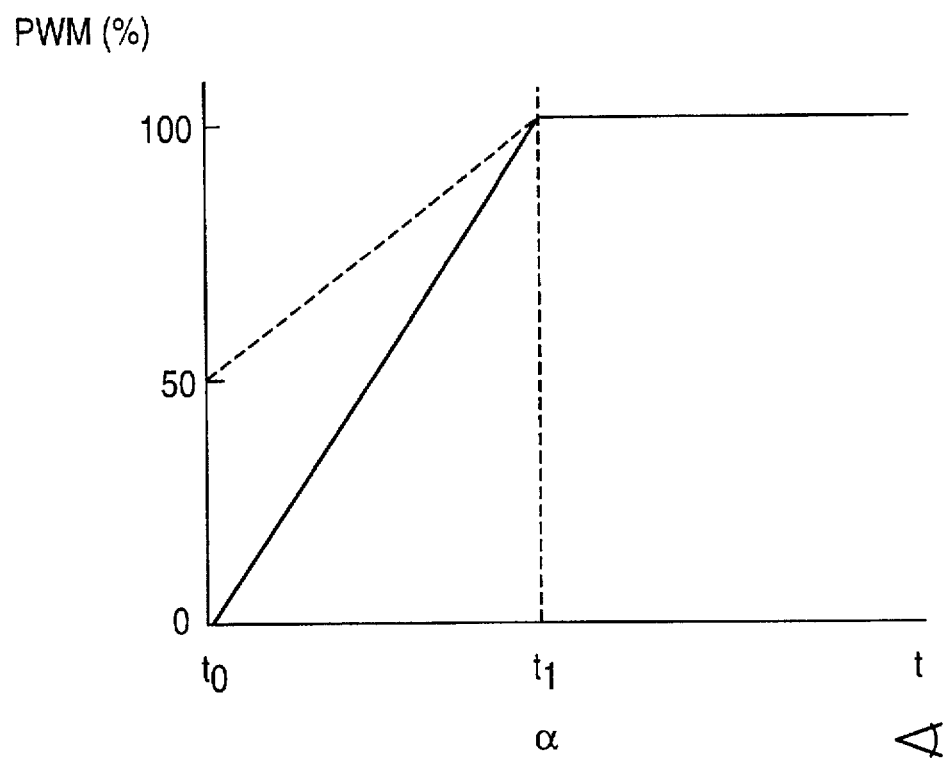
FIG. 3 shows a control signal characteristic in the example of a soft start.

FIG. 3 shows the characteristic of a control signal in which the pulse-width modulation changes as a function of time or the path. At a starting time $t_o$, the control signal has an initial value whose magnitude either is zero or, as indicated by the signal characteristic shown as a dashed line, deviates from zero. Because the control signal actuates a power output stage, which determines the rpm of a servomotor, for example by means of a voltage control, a certain rpm of the servomotor is associated with each initial value.

In the illustrated example, the control signal will now be pulse-width-modulated monotonically to the end value of 100% up to a time $t_1$, which can be, for example, 0.25 seconds. With the monotonic pulse-width modulation of the control signal, the rpm of the servomotor is simultaneously increased to its end value. By means of this gradual increase of the motor rpm, which includes a soft start, it is accomplished that no intense startup short-circuit current occurs with the actuation time, and a slowly-increasing force transmission onto the adjusting mechanism is achieved by means of a reduced starting torque. Because the servomotors typically perform the actual adjustment function by means of an interposed gear, a reduction in noise, for example by means of a gearless element, is simultaneously associated with the described soft start.

In an advantageous manner, the rpm characteristic can be observed by the motor electronics during the start of the entire motor system, and, in that it is compared to an anticipated rpm characteristic, when a deviation occurs, that is, that at a certain time t the motor rpm anticipated per se has not occurred, it can be concluded that, for example, a defect or impairment is present on the adjusting mechanism that could lead to an interference of the servomotor due to excessive force requirement. Hence, the described motor actuation can be used simultaneously for a diagnosis of the entire adjusting system.

As indicated in the example with the dashed line, an rpm that is reduced with respect to the end rpm can be used as the initial value for setting the rpm, with a 50% pulse-width modulation in the example. Thus, instead of a constant, linear rise in the pulse-width modulation, a step- or interval-wise increase in the rpm can be established.

A path-dependent control of the pulse-width modulation can be performed instead of time-dependent control of the pulse-width modulation.

In this instance, an angle transmitter can be used that regulates the pulse-width modulation as a function of an angle α, so that when an angle α, for example of 180°, is reached, the control signal has assumed the end value, and the servomotor has thus attained its nominal value.

Figure 4:
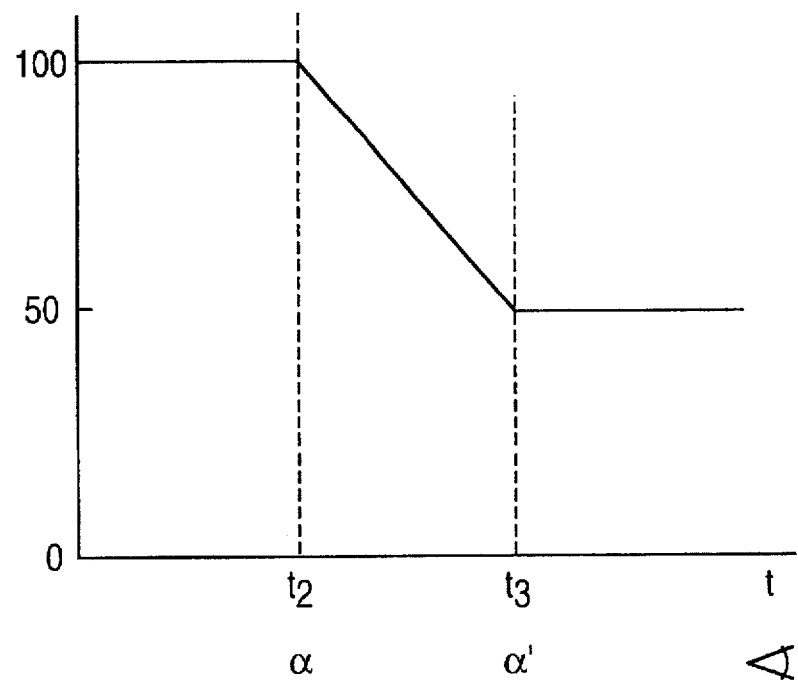
FIG. 4 a shows control signal characteristic in the example of a soft stop.

FIG. 4 shows the characteristic of the control signal by way of the example of a soft stop. At a time $t_2$ the control signal is pulse-width modulated monotonically over time to a time $t_3$, to 50% in the example. Because of the direct dependency of the pulse-width-modulated control signal with the rpm of the servomotor, the rpm of the servomotor is only half of the original nominal rpm at time $t_3$, where $t_3$ is, for example, $t_2+0.25$ seconds.

In an analogous manner, the control signal can, of course, be modulated down to the end value zero.

As already described in conjunction with FIG. 3, in a soft start the pulse-width modulation of the control signal can also be effected by means of a path-dependent angle transmitter, so that in the example, with an angle α'=α+180°, the control signal is likewise pulse-width-modulated to 50% of the initial value. By means of this set, reduced rpm of the servomotor, an improved fine setting of the devices to be adjusted, for example the setting of a particular seat position or degree of window opening, is advantageously possible in motor vehicles.

However, as a consequence of an exceedingly low battery voltage, it can happen that the rpm of the servomotor being established is too low to achieve a desired, sufficient setting speed. Here the instantaneous actual rpm can be monitored in a simple manner, and compared to a determined minimum rpm. If the actual motor rpm is now higher than the determined minimum rpm serving as a reference value, no engagement of the motor system is effected via the control signal. Should, however, the actual motor rpm be below the reference value, at certain sampling intervals the power output stage, which performs the actual control of the servomotor, is actuated until the actual motor rpm coincides with the determined minimum rpm by means of a stage-wise pulse-width modulation of the control signal, which is triggered by control electronics not shown in detail here. Should the minimum rpm of the servomotor still not be attained, despite the stage-wise pulse-width modulation of the control signal, it is at least determined that the servomotor is operated with its maximum torque, and that a source of error is possibly present, for example in the adjusting mechanism.

I claim:

1. A method of setting the rpm of an electric motor comprising the steps of: supplying operating voltage to the electric motor via a controllable power output stage; supplying a pulse width modulated control signal to the power output stage to control the voltage supplied to the motor, and an rpm of the motor; continuously measuring an actual rpm of the electric motor using a measuring device and providing an output corresponding to a measured actual rpm value; comparing the output corresponding to the measured actual rpm value to a predetermined reference rpm value; and, if, as a result of a comparison, the value of the reference rpm is not reached, changing the pulse width of the control signal until the reference rpm value is reached only if the measured actual rpm value is less than the predetermined reference rpm value.

2. The method according to claim 1, wherein the pulse-width of the control signal is changed as a function of at least one of time and path.

3. The method according to claim 1, wherein the pulse-width of the control signal is changed monotonically.

4. The method according to claim 1, wherein the pulse-width of the control signal which is changed has one of an initial value and an end value that deviates from zero.

5. The method according to claim 1, wherein said step of changing further includes changing the pulse width of the control signal when a minimum deviation of the motor rpm from the reference value occurs over a predetermined time interval.

6. The method according to claim 1, wherein the pulse width of the control signal is changed incrementally.

7. The method according to claim 1, wherein said predetermined reference rpm value changes dependent on elapsed time.

8. The method according to claim 1, wherein said predetermined reference rpm value changes dependent on total path traversed by a point on the motor armature.

9. The method according to claim 1, wherein said predetermined reference rpm value corresponds to a minimum acceptable rpm value.

10. The method according to claim 1, wherein said step of changing comprises increasing the pulse width of the control signal until the reference rpm value is reached.

11. A method of setting the rpm of an electric motor comprising the steps of: supplying operating voltage to the electric motor via a controllable power output stage; supplying a pulse width modulated control signal to the power output stage to control the voltage supplied to the motor, and an rpm of the motor; continuously measuring an actual rpm of the electric motor using a measuring device and providing an output corresponding to a measured actual rpm value; comparing the output corresponding to the measured actual rpm value to a predetermined reference rpm value which changes dependent on elapsed time; and, if, as a result of a comparison, the value of the reference rpm is not reached, changing the pulse width of the control signal until the reference rpm value is reached.

12. The method according to claim 11, wherein said step of changing comprises one of increasing and decreasing the pulse width of the control signal until the reference rpm value is reached.

13. A method of setting the rpm of an electric motor comprising the steps of: supplying operating voltage to the electric motor via a controllable power output stage; supplying a pulse width modulated control signal to the power output stage to control the voltage supplied to the motor, and an rpm of the motor; continuously measuring an actual rpm of the electric motor using a measuring device and providing an output corresponding to a measured actual rpm value; comparing the output corresponding to the measured actual rpm value to a predetermined reference rpm value which changes dependent on total path traversed by a point on the motor armature; and, if, as a result of a comparison, the value of the reference rpm is not reached, changing the pulse width of the control signal until the reference rpm value is reached.

* * * * *